United States Patent
Jain et al.

(10) Patent No.: US 9,367,123 B2
(45) Date of Patent: Jun. 14, 2016

(54) SYSTEMS AND METHODS FOR COLLABORATIVE BROWSING ON THE TELECOM WEB

(75) Inventors: Anupam Jain, Gurgaon (IN); Amit A. Nanavati, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 12/696,359

(22) Filed: Jan. 29, 2010

(65) Prior Publication Data

US 2011/0191696 A1    Aug. 4, 2011

(51) Int. Cl.
*G06F 15/16* (2006.01)
*G06F 3/00* (2006.01)
*H04M 1/64* (2006.01)

(52) U.S. Cl.
CPC .................. *G06F 3/00* (2013.01); *G06F 15/16* (2013.01); *H04M 1/64* (2013.01)

(58) Field of Classification Search
CPC ........................... G06F 17/30899; G06F 3/167
USPC .................................. 715/758, 753; 709/228
See application file for complete search history.

(56) References Cited

U.S. PATENT DOCUMENTS

| | | | |
|---|---|---|---|
| 6,480,890 B1 | 11/2002 | Lee, Jr. et al. | |
| 6,487,195 B1* | 11/2002 | Choung | G06F 17/30873 370/352 |
| 7,016,848 B2 | 3/2006 | St. John Brittan et al. | |
| 2002/0138624 A1* | 9/2002 | Esenther | H04L 29/06 709/227 |
| 2004/0001575 A1* | 1/2004 | Tang | G06Q 10/109 379/88.04 |
| 2004/0225716 A1* | 11/2004 | Shamir | G06F 17/30873 709/204 |
| 2005/0163136 A1* | 7/2005 | Chiu | H04L 67/02 370/401 |
| 2005/0193062 A1* | 9/2005 | Komine | G06Q 10/10 709/204 |
| 2006/0129942 A1* | 6/2006 | McCary | G06Q 10/10 715/741 |
| 2007/0143470 A1* | 6/2007 | Sylvain | H04L 67/16 709/224 |
| 2007/0299746 A1* | 12/2007 | Haley | G06Q 10/10 705/28 |
| 2008/0008304 A1 | 1/2008 | Deutsch et al. | |
| 2008/0144783 A1* | 6/2008 | Kumar | H04M 3/42153 379/88.13 |
| 2008/0222295 A1* | 9/2008 | Robinson | G06F 17/30867 709/227 |
| 2009/0132220 A1* | 5/2009 | Chakraborty | G06F 8/30 703/13 |
| 2009/0138262 A1* | 5/2009 | Agarwal | G06F 17/30746 704/235 |
| 2009/0147958 A1 | 6/2009 | Calcaterra et al. | |
| 2009/0149158 A1 | 6/2009 | Goldfarb et al. | |
| 2009/0175427 A1 | 7/2009 | Raniere et al. | |

(Continued)

FOREIGN PATENT DOCUMENTS

CN    1295292 A    5/2001

OTHER PUBLICATIONS

Bo, Cheng, et al., "Design and Implementation of Enhanced State Machine for Telecom Web Service," State Key laboratory of Networking and Switching Technology, Beijing University of Posts & Telecommunications, 2008, pp. 1-5, IEEE Xplore Digital Library.

(Continued)

*Primary Examiner* — Daeho Song
(74) *Attorney, Agent, or Firm* — Ference & Associates LLC

(57) ABSTRACT

Embodiments of the invention broadly contemplate systems, methods, apparatuses and program products providing collaborative browsing on the World Wide Telecom Web (WWTW) via a collaborative WWTW browser. According to embodiments of the invention, collaborative usage of the WWTW is enabled via connecting users and VoiceSites together.

19 Claims, 6 Drawing Sheets

(56) References Cited

U.S. PATENT DOCUMENTS

| | | | |
|---|---|---|---|
| 2009/0232087 | A1 | 9/2009 | Chen et al. |
| 2009/0232287 | A1* | 9/2009 | Agarwal ............... G10L 15/265 379/93.14 |
| 2009/0235181 | A1* | 9/2009 | Saliba .................... G06Q 10/10 715/753 |
| 2010/0131866 | A1* | 5/2010 | Nielsen ................. H04L 12/822 715/758 |
| 2010/0191799 | A1* | 7/2010 | Fiedorowicz ..... G06F 17/30873 709/203 |
| 2011/0106884 | A1* | 5/2011 | Agarwal ............. H04M 3/4938 709/204 |

OTHER PUBLICATIONS

Kumar, Arun et al., "VOISERV: Creation and Delivery of Converged Services through Voice for Emerging Economies", World of Wireless, Mobile and Multimedia Networks, WoWMom Conference, Jun. 18-21, Espoo, Finland, 9 pages, IEEE Xplore Digital Library.

Kumar, Arun, "Telecom Web Technologies", 1 page. Accessed Dec. 3, 2009 at http://domino.research.ibm.com/comm/research_people.nsf/pages/arun_kumar.wwtwtech.html.

Kumar, Arun, et aL., "WWTW: The World Wide Telecom Web", Proceedings of the 2007 workshop on Networked systems for developing regions, Aug. 27-31, 2007, Kyoto, Japan, 6 pages, ACM Digital Library.

Agarwal, Sheetal, et al., "VoiKiosk: Increasing Reachability of Kiosks in Developing Regions", Proceedings of the 17th International World Wide Web Conference (WWW 2008), Apr. 21-25, 2008, Beijing, China, pp. 1123-1124, ACM Digital Library.

Agarwal, Sheetal, "The World Wide Telecom Web Browser", Proceedings of the 17th International World Wide Web Conference (WWW 2008), Apr. 21-25, 2008, Beijing, China, pp. 1121-1122. ACM Digital Library.

Agarwal, Sheetal K., et al., "HSTP: Hyperspeech Transfer Protocol", Proceedings of the 18th ACM Conference on Hypertext and Hypermedia, Sep. 10-12, 2007, Manchester, UK, 11 pages. ResearchGate.

* cited by examiner

006
SYSTEMS AND METHODS FOR COLLABORATIVE BROWSING ON THE TELECOM WEB

BACKGROUND

The subject matter described herein generally relates to the World Wide Telecom Web (WWTW) which consists of interconnected voice applications (called VoiceSites) that can be accessed by a regular phone call.

The World Wide Web (WWW) enabled quick and easy information dissemination and brought about fundamental changes to various aspects of life. However, a very large number of people, mostly in developing regions, are still untouched by this revolution. Compared to personal computers (PCs), the primary access mechanism to WWW, mobile phones have made a phenomenal penetration into this population segment. Low cost of ownership, the simple user interface consisting of a small keyboard, limited menu and voice-based access contribute to the success of mobile phones. However, apart from basic voice communication, these people are not able to exploit the benefits of information and services available to WWW users.

A user can access the WWTW and interact with a VoiceSite thereof through speech. This is particularly useful in developing regions where Internet penetration is low and phone penetration is high. Since the WWTW can be accessed through a standard phone instrument (for example, voice only), individuals not equipped with high-end electronic devices such as PCs or smart phones can access the WWTW.

BRIEF SUMMARY

Embodiments of the invention broadly contemplate systems, methods, apparatuses and program products providing collaborative browsing on the World Wide Telecom Web (WWTW). According to embodiments of the invention, collaborative usage of the WWTW is enabled via connecting users and VoiceSites together. Embodiments of the invention provide mechanisms allowing WWTW users to visit voicesites together and engage in several forms of collaborative social interaction on the WWTW, such as conferencing, using simplified electronic devices and voice connections to a collaborative WWTW browser.

In summary, one aspect of the invention provides an apparatus comprising: one or more processors; and a computer readable storage medium having computer readable program code embodied therewith and executable by the one or more processors, the computer readable program code comprising: computer readable program code configured to receive one or more commands from one or more end users over one or more voice channel links; computer readable program code configured to interpret the one or more commands; and computer readable program code configured to establish one or more additional voice channel links, according to the one or more commands, to establish a collaborative telecom web browsing session between two or more end users and one or more voice applications.

Another aspect of the invention provides a method comprising: receiving one or more commands from one or more end users over one or more voice channel links; interpreting the one or more commands; and establishing one or more additional voice channel links, according to the one or more commands, to establish a collaborative telecom web browsing session between two or more end users and one or more voice applications.

A further aspect of the invention provides a computer program product comprising: a computer readable storage medium having computer readable program code embodied therewith, the computer readable program code comprising: computer readable program code configured to receive one or more commands from one or more end users over one or more voice channel links; computer readable program code configured to interpret the one or more commands; and computer readable program code configured to establish one or more additional voice channel links, according to the one or more commands, to establish a collaborative telecom web browsing session between two or more end users and one or more voice applications.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
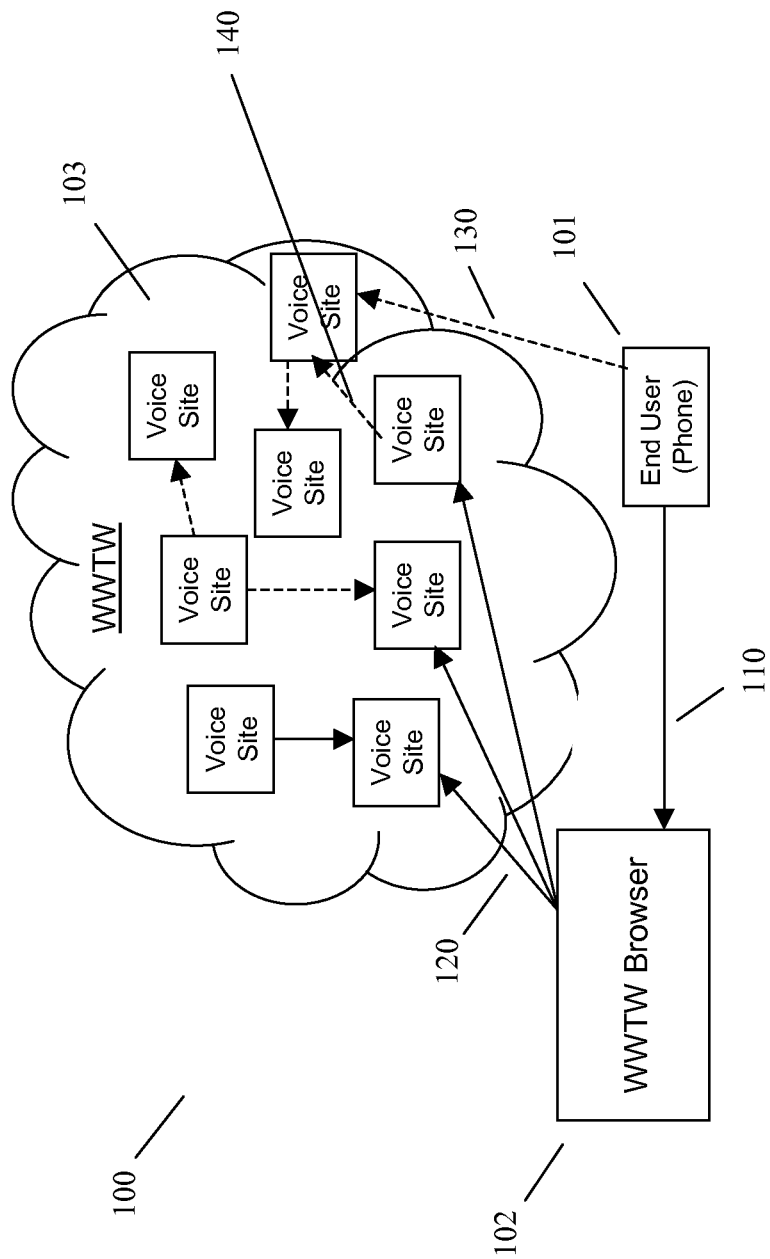
FIG. 1 illustrates the World Wide Telecom Web environment according to an embodiment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

Embodiments of the invention broadly contemplate systems, methods, apparatuses and program products providing collaborative browsing on the World Wide Telecom Web (WWTW). According to embodiments of the invention, collaborative usage of the WWTW is enabled via connecting users and VoiceSites together. Embodiments of the invention provide mechanisms allowing WWTW users to visit VoiceSites together and engage in several forms of social interaction on the WWTW, such as conferencing, using simplified electronic devices and voice connections.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Conventional telephony voice applications have been used by enterprises to provide an alternate access channel to their customers. The technical sophistication of these applications vary a lot, where the simplest applications use the phone keypad to navigate the voice menu, while the sophisticated applications can process natural language in a human voice. Such voice applications find a wider acceptability since the access interface is a phone device, so people can access these applications on the move. With the modality of interaction being voice, it is fairly easy to use and navigate through these applications.

The implications of phone access and ease-of-use are even higher in developing countries where the alternative of Web access is not yet penetrative. The Internet penetration in developing regions is still (in the year 2008) on the order of less than 10%.

However the use of telephony voice applications is still restricted to a handful of enterprises. One major reason for this is that the voice applications, unlike the websites, are still isolated applications that have a specific piece of information or service. Interconnection of voice applications (referred to herein as VoiceSites) is therefore a requirement to enable their spread, as the World Wide Web (WWW) has been able to achieve through hyperlinks that link websites.

The WWTW (or Telecom Web or T-Web) provides a mechanism and the advantages to develop a web of voice applications. FIG. 1 illustrates a high level view of a WWTW environment 100 according to an embodiment of the invention. An end user 101 connects to the WWTW 103, having a plurality of interconnected VoiceSites, using his or her phone. The end user 101 connects to the WWTW 103 via a WWTW Browser 102, which facilitates communication between end user 101 and the VoiceSites. While only one end user 101 is illustrated, a plurality of end users may connect through one or more WWTW Browsers. Moreover, a WWTW browser may be incorporated into a VoiceSite. Thus, FIG. 1 is simply a non-limiting example of the high level architecture involved.

The WWTW Browser 102 can support standard browsing features used on the WWW, even though the end user 101 does not have a high-end device such as a PC. The WWTW browser 102 can be designed as a server side application to be accessed by a standard phone device (for example a voice only phone or the like) over the voice channel. The WWTW browser 102 uses call-control features and VoiceXML tags to manage a user session. It provides a seamless navigation experience to the end user 101. Some architectural details of a WWTW browser 102 are provided below.

By way of architectural overview, a traditional web browser (such as Internet Explorer® or Firefox® web browsers) is client-side software that resides on the user's PC or a high-end phone that has Internet access. In the WWTW, the client device is typically a low-end phone (for example, voice-only) and the access to a VoiceSite is through voice interaction over a telephone call rather than a data channel. This implies that the WWTW browser 102 needs to be designed as a server-side technology. Firefox® is a registered trademark of the Mozilla Foundation. Internet Explorer® is a registered trademark of Microsoft Corporation.

By way of illustrative example, a user makes a phone call 110 by dialing the WWTW browser 102 phone number. Once he or she is connected to the WWTW browser 102, he or she can then access 120 the VoiceSites in the Telecom Web by different WWTW browser 102 commands. Being a server-side technology, it is evident that a single WWTW browser 102 can support multiple end users.

Given this operational model, the WWTW browser 102 commands issued by a user 101 can either be spoken word commands or keypad (often known as DTMF—Dual Tone Multiple Frequency) commands since a basic phone instrument 101 and the telephone link 110 between the phone and the WWTW browser 102 cannot support any other modality. The interpretation of these commands happens at the WWTW browser 102. Therefore the WWTW browser 102 needs a speech recognition system if voice commands are supported. A VoiceSite also typically uses the same interaction modalities.

The WWTW browser 102 serves as the window through which a user 101 accesses the VoiceSites hosted in the Telecom Web 103 in a seamless fashion. A user 101 can access individual VoiceSites directly 130 as well, without involving the Telecom Web browser 102. However, in that case, the user either needs to know the address of the VoiceSite to be visited or the current open VoiceSite should contain a hyperlink (140) to that VoiceSite.

Multiple users can surf the Telecom Web 103 through the same WWTW browser 102 instance. Similarly, a single user 101 can choose to browse through different WWTW browsers at different times. The WWTW browser 102 itself can be considered to be a special VoiceSite that provides navigational features to the user 101.

The user 101 connects to the WWTW browser 102 and then accesses any VoiceSite of her/his interest. Once a user 101 is connected to a VoiceSite, he or she is able to interact with the VoiceSite and the WWTW browser 102 simultaneously. This is non-trivial since the WWTW browser 102 commands can be issued at any point of time while navigating a VoiceSite. This is relatively a simple task in Graphical User Interfaces where traditional browsers (web browsers such as Internet Explorer® or Firefox® web browsers) split the screen space to accommodate a browser's command menu and the website content. However, in the absence of this spatial dimension in the WWTW browser 102, it is non-trivial to ensure that the user can communicate with the WWTW browser 102 and the VoiceSite being browsed.

A mechanism to distinguish between the WWTW browser 102 commands and the VoiceSite commands is to switch to the WWTW browser 102 command mode by saying a unique browser specific keyword like "T-Web Browser" or pressing special keypad sequence. This keyword would take the user 101 to the WWTW browser 102 browser command menu where the user 101 can enter the WWTW browser 102 commands such as "back", "forward" and "bookmark" (this VoiceSite). The assumption is that this keyword would not be present in any VoiceSite's grammar. Another approach is to append a prefix word browser to all the WWTW browser 102 commands such as "browser back" and "browser new". This does not require the user to switch to any separate command mode for issuing commands. The assumption is that these phrases (with the prefix) would not be a part of any VoiceSite's grammar.

Figure 2:
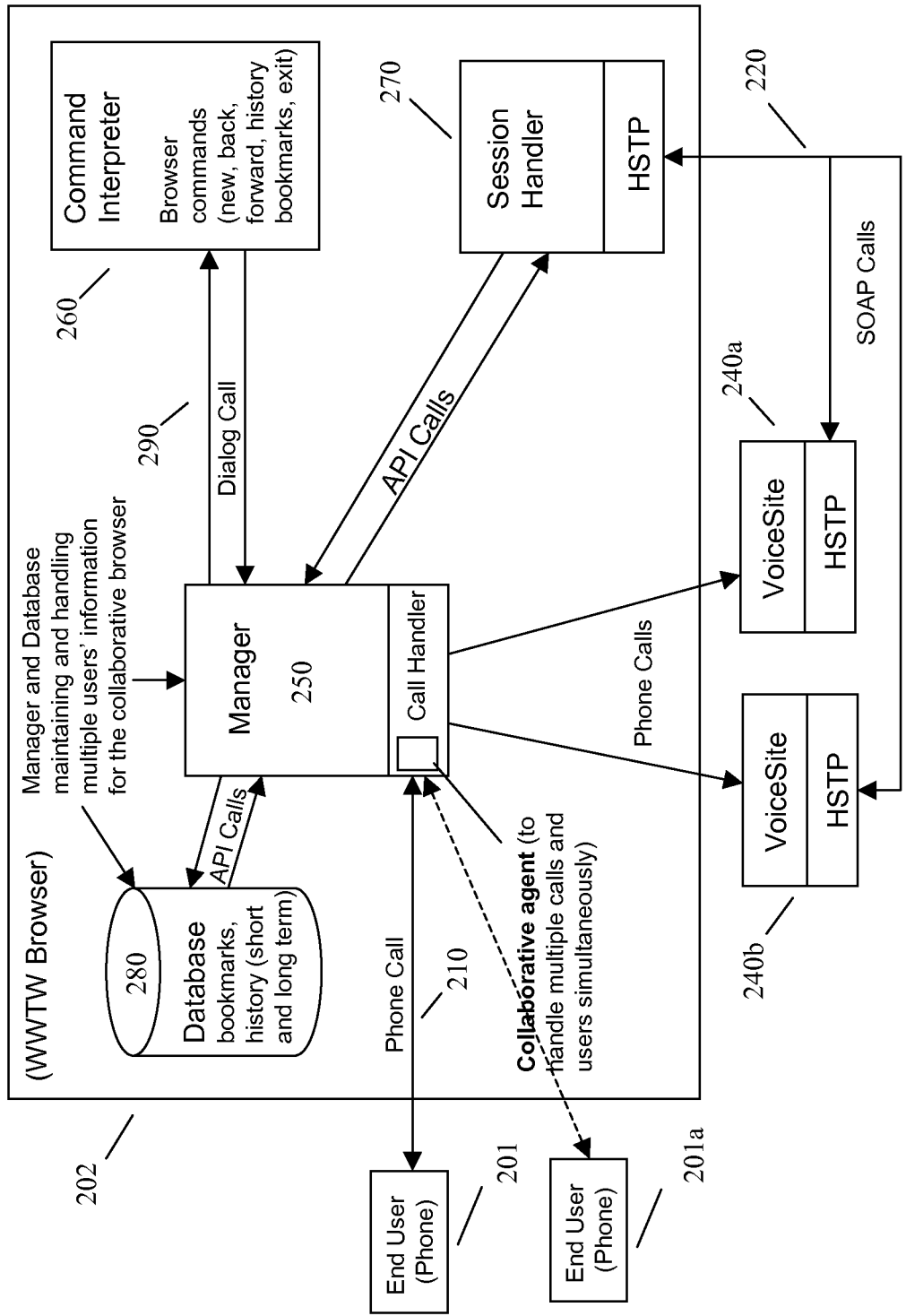
FIG. 2 illustrates a collaborative WWTW browser according to an embodiment.

Referring to FIG. 2, a component level architecture of a collaborative WWTW browser is presented herein by way of non-limiting example. The collaborative WWTW browser 202 is first described with regard to a single user context, and thereafter is described in the context of multiple users browsing the WWTW in a collaborative context. The collaborative WWTW browser, similar to the WWTW browser described above, enables a user to browse through VoiceSites, record bookmarks, and the like; the collaborative WWTW browser additionally enables collaborative social interactions/telecom web browsing between multiple users (and subsets thereof), as described further herein.

The collaborative WWTW browser 202 can use for example CCXML to conference two call legs (one connection 210 between the collaborative WWTW browser 202 and the user 201, a second connection 220 between the collaborative browser and a VoiceSite 240*a* and/or another end user 201*a*). This allows the collaborative WWTW browser 202 as well as the VoiceSite 240*a* (and therefore their corresponding speech recognition systems) to remain active in the same telephone call. Notably, this does not require the end-user phone 201 to support conferencing. The phone call 210 between the phone instrument 201 and the collaborative WWTW browser 202 and between the collaborative WWTW browser 202 and the VoiceSite 240*a* is a three party conference call through the CCXML. Drawing parallels from the conventional, visual (web) browser, if a speech command is specific to the collaborative WWTW browser 202, then the collaborative WWTW browser 202 takes action on it. On the other hand, if the speech command is specific to the VoiceSite 240*a*, the collaborative WWTW browser 202 takes no action. This is similar to a mouse click in the web browser part of the pane versus a mouse click in the website content.

A Call Manager 250 (with call handler), Command Interpreter 260, Session Manager/Handler 270 and Data Model in a Database 280 form the core components of the collaborative WWTW browser 202. The interaction between these components is essentially: calls 210 from the end-user 201 land to the Call Manager 250 through a simple phone call and the Call Manager 250 makes a dialog call 290 to the Command Interpreter 260 which then presents the collaborative WWTW browser 202 commands to the user 201. The Command Interpreter 260 is responsible for interactions with the end user(s) 201, 201*a*. It provides the user 201 with the choice of commands and interprets commands issued by the user 201. When a command to access a VoiceSite 240*a* is issued by the user 201, it is passed on to the Call Manager 250.

The Call Manager 250 then makes the phone call 220 to the VoiceSite 240*a*, while retaining the original call 210 with the collaborative WWTW browser 202. Thus, a three-party call is established by the Call Manager 250. The Call Manager 250 also makes relevant API calls to register events in the collaborative WWTW browser database 280. A Data Model is designed to store data related to the browsing session of the user 201.

While browsing the VoiceSite 240*a*, a user can issue a collaborative browser command to be transferred to a new VoiceSite 240*b*. It should be noted that the new VoiceSite 240*b* could equally be another end user 201*a* (phone) to be conferenced in, such as a stored contact in the database 280. This command is again interpreted by the Command Interpreter 260 and an HSTP layer transfers the relevant information through the Session Handler 270. The Session Handler 270 manages the session information for the current user browsing session. It then passes on the message to the Call Manager 250 through an API call. It also sends a SOAP 220 message through the HSTP to the new VoiceSite 240*b*. The Call Manager 250 then establishes the phone call connection of the to the new VoiceSite 240*b*. It also repeats the step of making the appropriate API calls to register the navigation in the browser database 280. It should also be noted that another user 201*a* can connect to the same collaborative WWTW browser 202, or be linked with the initial end user 201 via another voice channel link originating from this collaborative WWTW browser 202 to the another user 201*a*.

Figure 3:
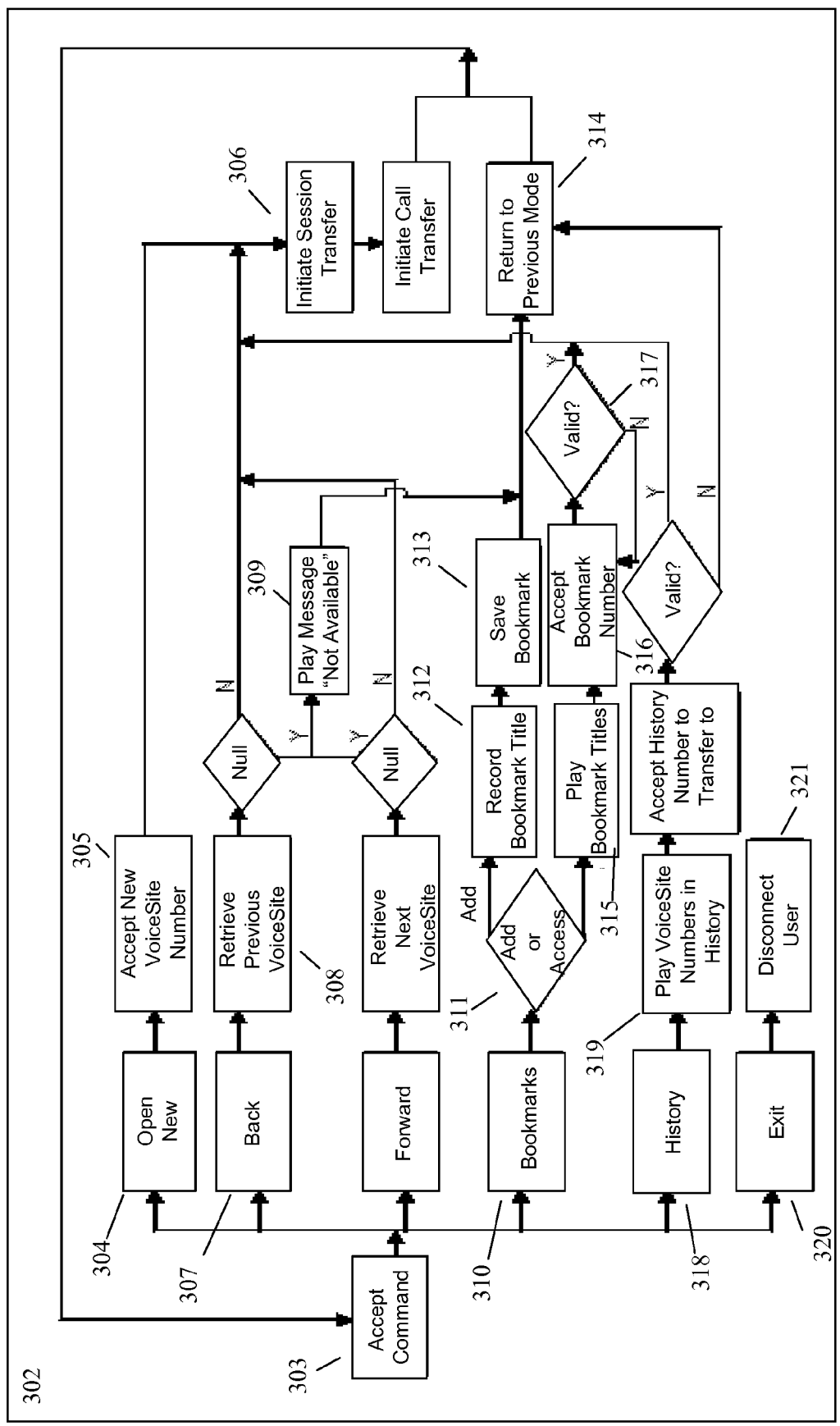
FIG. 3 illustrates a flow of collaborative WWTW browser selections available through a collaborative WWTW browser according to an embodiment.

According to an embodiment of the invention, the application logic of the collaborative WWTW browser 302 is responsible for providing its core functionality. FIG. 3 illustrates non-limiting and exemplary commands supported by the collaborative WWTW browser 302 along with the application flow triggered by each. While the commands are described with respect to a single user, it should be noted that any of the users engaged in the collaborative telecom web browsing session can make use of these commands independently. For example, the following commands are accepted 303 by the collaborative browser:

Open New: When a user requests 304 connection to a new VoiceSite, the Command Interpreter accepts 305 the phone number of the VoiceSite and passes this to the Session Manager. The Session Manager then initiates 306 a session transfer to the new VoiceSite through the HSTP. Once a session is established, the Call Manager then initiates a phone call transfer to the new VoiceSite and the user is connected to the VoiceSite. In parallel, the Call Manager publishes the information of the VoiceSite to the navigation history of the user in the Database. While navigating the VoiceSite, the user can speak any browser command as shown in FIG. 3.

Back: If a user issues a back command 307, the Call Manager makes an API call to the database and retrieves 308 the details of the previously visited VoiceSite. If there is no VoiceSite that was visited by the user in the current browsing session, the Command Interpreter plays 309 a "Not Available" message to the user and the session is transferred back to the same VoiceSite that the user was browsing. If there was a previously visited VoiceSite, the Call Manager gets the details from the Database and passes the information to the Session Manager and the flow proceeds in the same way as explained in the Open New case.

Forward: The flow for the forward command is similar to the back command, except that the Call Manager retrieves entries from the forward column of the database.

Bookmark: When a user issues a bookmark command 310, the Command Interpreter asks 311 the user whether he or she wishes to add a bookmark or access the previously stored bookmarks. To add a bookmark, the user records 312 an audio label for the VoiceSite and the details of the VoiceSite along with the audio label are stored 313 in the Database. The interaction is then returned 314 to the previous state. If a user wishes to access previously stored bookmarks (which could be his or her own bookmarks or the bookmarks of a "friend" selected from a "friends" list), then the audio labels of the stored bookmarks are played 315 to the user sequentially by the Command Interpreter. The user can select 316 a specific bookmark and then the Call Manager checks in the Database if it has the required details of the VoiceSite. If the details exist 317, then the session and the call is transferred to the bookmarked VoiceSite 306. If not, the Command Interpreter interacts with the user to choose another bookmark.

History: A user may choose to look at 318 previously visited VoiceSites (which could be his or her own browsing history or the browsing history of a subset or group of users selected for example from a "friends" list). The browser retrieves the information from the Database and the Command Interpreter presents 319 the results to the user. As is the case with bookmarks, a user can then choose to browse a specific VoiceSite from this list. The application flow for history is similar to the bookmarks for establishing a session.

Exit: At any point during the browsing, a user may issue an exit command 320 to close the browser session. The Call Manager drops the call 321 and this disconnects the user from the browser.

When any of the above commands are invoked, the VoiceSite is disconnected by the collaborative WWTW browser 302 and hence the session information of the VoiceSite is sent to the browser Session Manager by the HSTP layer. However, users can decide to stay connected with one another and navigate to a new VoiceSite jointly, in which case the voice link between the users is maintained while a new voice link is established for the new VoiceSite.

Even though the collaborative WWTW browser 302 can be invoked and implemented like a VoiceSite, it's requirement for managing multiple call connections and sessions across VoiceSites makes it an ideal application to be implemented using CCXML. CCXML is a W3C standard for voice browser call control that has extended capabilities for maintaining multiple call sessions and also the ability to integrate VXML applications within the call flow. For simplicity, herein are presented a simulated call flow using VXML-jsp applications and Java™ Beans. Java™ is a trademark of Sun Microsystems, Inc.

Described herein are the classes, interfaces, data model and the modifications to HSTP that were performed in the development of the collaborative WWTW Browser. The following classes have been used in implementations:

CallManager( ) class manages all the connections to VoiceSites and makes API calls to Session Manager and the DB class (explained below). Since Voice XML has been used in implementation, bridged transfer is used to connect to the VoiceSites. In a Voice XML bridged transfer, a grammar can be kept active which listens to the WWTW browser commands while the user is connected to the VoiceSite.

SessionManager( ) class maintains the user's session information while the user is browsing different VoiceSites. The transferSession( ) method is invoked by the Call Manager to indicate to the Session Manager to transfer session to a VoiceSite before initiating a call transfer to it. The HSTP layer of the Session Manager in turn triggers a SOAP request to the target VoiceSite's HSTP layer with the corresponding session information. The session information related to a particular VoiceSite can be of two types: (a) user's session information pertaining only to the VoiceSite that the user is visiting (for example, login or state information); and (b) user's context information that needs to be transferred to a different VoiceSite when a hyperspeech link is accessed (for example, for transferring payment information).

DB( ) class maintains the database for history, bookmarks and user settings. It has methods for inserting a new voice site to the short term and long term history, for lookup of short-term and long-term history, insert and lookup of bookmarks to/from the database and for cleanup to clean the user's session information if the user disconnects from the collaborative browser.

The classes described above also implement methods to provide the following logical interfaces for communication across these classes:

Call Manager-Session Manager: The Call Manager indicates to the Session Manager to transfer the user session before moving back or forward to any VoiceSite.

Call Manager-Database: Call Manager issues commands to the database such as Insert VoiceSite, Set Setting, Lookup History, Insert Bookmark, Lookup Bookmarks to update and/or retrieve user history, settings and bookmarks.

Session Manager-HSTP: A Session Manager indicates to the HSTP layer to transfer session information to the VoiceSite (as and when required by the Call Manager).

The database for the collaborative WWTW browser has been implemented for example on Apache Derby. Browsing history is stored in two separate databases: short-term history is maintained for example "per user session". If the user issues a back/forward command, the short-term history is looked upon to find out the corresponding VoiceSite number. This history is deleted after the user's browser session is over.

Long-term history is maintained for example "per user" across all sessions. If the user issues a history command, he or she can browse all the VoiceSites visited over a certain period of time.

Bookmarks are stored for each user with an audio file that contains the title of the bookmark recorded by the user.

To efficiently use HSTP along with the browser framework, a couple of modifications have been made to its functionality and operation, as briefly outlined below.

HSTP Message Format: The HSTP message that is sent to other HSTP layers is as follows:

| ID | Description |
| --- | --- |
| CALLER_NO | Phone number of the person who called the WWTW browser |
| SESSION_ID | Session ID for the user's WWTW browser session |
| VA1 | Current VoiceSite's number |
| VA2 | Target VoiceSite's number |
| AC1 | Session information from current VoiceSite |
| AC2 | Session information for target VoiceSite |

VA2 and AC2 will be sent in case a voice link is being traversed or when the collaborative WWTW browser's Session Manager is sending session information to a VoiceSite. Hop number is no longer needed since the browser will be maintaining the user history. Also, 'Type' parameter has been removed because all VoiceSite traversals will be standard call transfers and the reconnection attempts will be monitored by the collaborative WWTW browser.

To efficiently maintain a user's (or a group of users') session information, HSTP will now send the session information to the Session Manager of the collaborative WWTW browser as soon the user's connection to the VoiceSite is broken (this also takes care of the use case when the collaborative WWTW browser connection disconnects while user is still browsing a VoiceSite).

Embodiments of the invention enable multiple users to engage in collaborative browsing of VoiceSites in the Telecom Web. The inventors have recognized limitations of conventional telephony systems prevent users of the WWTW from engaging in collaborative browsing. For example, conventional types of conferencing are currently limited to essentially: 1) dialing out to everyone and bridging everyone together in multi-user conference call; and 2) dialing in to a central number to participate in the multi-user conference call.

Many restrictions accompany conventional conferencing techniques. For example, if everyone is connected, a user cannot send "whispers" (private messages) to some subset of users within the multi-user conference call. Moreover, if there is no central number, users are bound by limitations of hardware on their local devices (that is, on their phones). Thus, a user cannot, for example, put on hold a subset of users in a multi-user conference call.

Furthermore, bookmarked (saved) numbers are conventionally available only on the client-side device (for example, stored in a "contacts" list of the user's phone). Again, if there is no central number, a user needs to know the number of the person to be conferenced in. In conventional systems, it is often difficult or impossible to find out who else is connected (by all users) to the multi-user conference call. Recording calls and sharing VoiceSite Resource Locators (VRLs) (the number by which a VoiceSite is uniquely identified) is likewise not available. Moreover, a user must physically press buttons for hold, conference, et cetera.

Embodiments of the invention therefore provide for collaborative browsing on the WWTW. According to embodiments of the invention, collaborative usage of the WWTW is enabled via connecting users and VoiceSites together using the collaborative WWTW browser. Embodiments of the invention provide mechanisms allowing WWTW users to visit voicesites together and engage in several forms of social interaction on the WWTW, such as conferencing, using simplified electronic devices and voice connections.

Figure 4A:
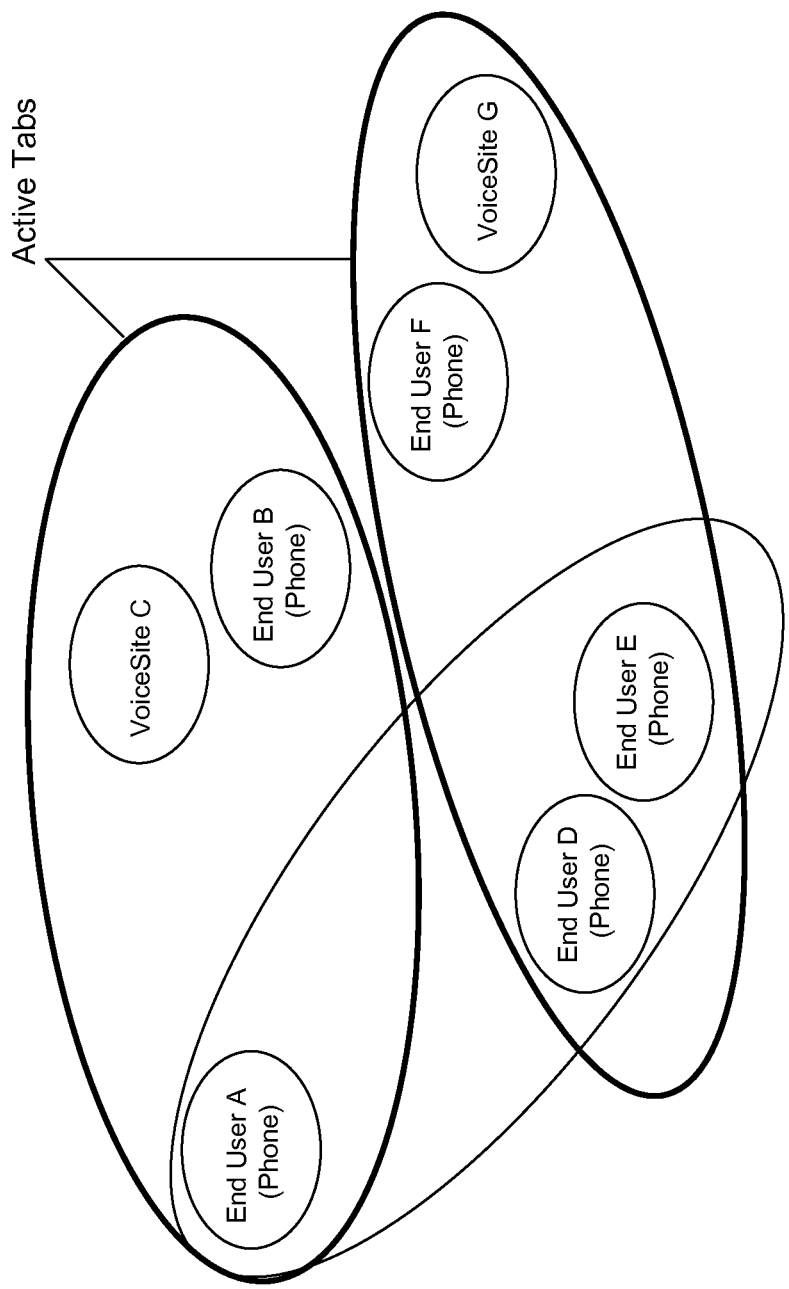
FIG. 4(A-B) illustrates an example of tabbed collaborative WWTW browsing sessions according to an embodiment.

By way of non-limiting example, a tabbed browsing session according to an embodiment of the invention is illustrated in FIG. 4(A-B). In FIG. 4A, End User A is browsing VoiceSite C along with End User B. End User D, End User E and End User F are all browsing VoiceSite G together. Thus, a tab is active for End User A and End User B (browsing VoiceSite C), and a tab is active for End User D, End User E, and End User F (browsing VoiceSite G). An active tab indicates that voice links are established between the tabbed entities.

Figure 4B:
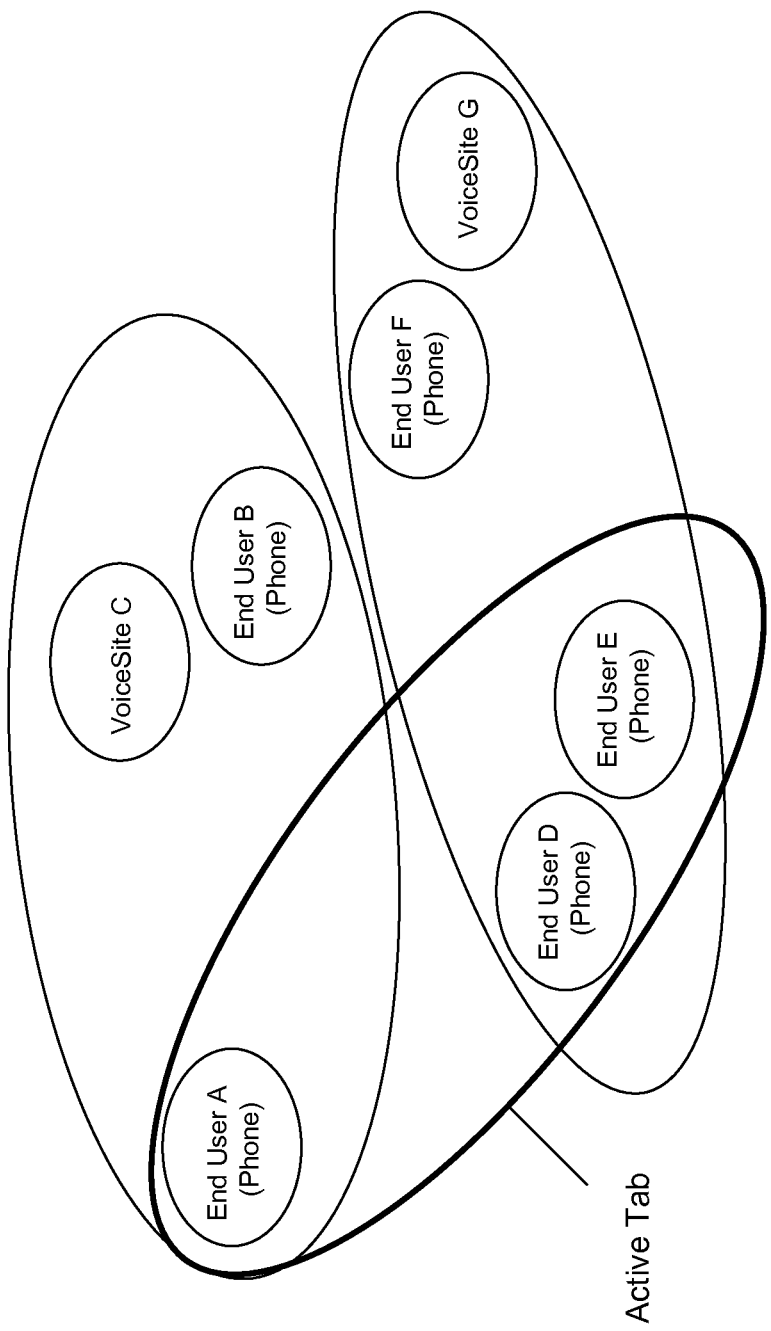

While browsing VoiceSite C, End User A may choose to put End User B on hold and start a conversation with End Users D and E, with End User F being placed on hold. Accordingly, the active tab becomes that between End User A, End User D and End User E, as shown in FIG. 4B. Note that because the collaborative WWTW browser is managing the different legs of the calls for these users, the users no longer in the active tab(s) are not necessarily disconnected from the WWTW, and a user my re-establish the connection or establish a new connection (with another VoiceSite) by using a simple command, such as a "back" or "forward" command, discussed further herein.

With collaborative browsing of the WWTW according to embodiments of the invention, some possible actions include but are not limited to the following. End User A can choose to end or place on hold the conversation/interaction with any of the currently connected parties (either End Users or VoiceSites) and continue with others. This is accomplished essentially by eliminating/establishing the voice links with the desired entities. This selection is enabled via the collaborative WWTW browser through simple menu commands. End User A can also combine groups (for example, End User D, End User E, End User B and VoiceSite C) into one large conference call. Moreover, End User A can continue a conference call with End User D and End User E and also add End User B while disconnecting/navigating away from VoiceSite C. A user on hold (for example, End User B and End User F) can start their own conversation while they are on hold, or can browse a VoiceSite (for example, VoiceSite C or VoiceSite G) together by establishing new links to those sites. Any of the End Users can use "hands free" commands, such as "back", "forward", "new" or "exit" to change, start or end a conference/link to another party (either End User or VoiceSite).

Referring back to FIGS. 2 and 3, for example, a user can utilize "hands free" commands via the collaborative WWTW browser 202 as follows. A user currently visiting a VoiceSite can speak "back", communicated to Call Manager 250 via link 210. The Call Manager can ascertain 308 from the database 280 the previous VoiceSite the user was at, and link the user (for example, link 220) to that VoiceSite. Similarly, a user linked back to a previous VoiceSite can proceed "forward" again using a "forward" command. Moreover, a user can call up a new VoiceSite and/or End User or exit a VoiceSite and/or disconnect from another End User by speaking the words "new" or "exit", respectively. Thus, the Call Manager 250 receives these commands and, with the help of Command Interpreter 260, determines the desired action(s), using the database 280 and session handler 270 as necessary to change the voice links being requested without dropping the call (ending the session).

Accordingly, utilizing a collaborative WWTW browser according to an embodiment of the invention, multiple users can engage in an interactive and collaborative browsing of VoiceSites within the Telecom Web, approximating WWW collaborative browsing sessions. Thus, multiple users can visit VoiceSites together. By selectively placing users on hold, a user can pass secret information (like passwords contained in short voice messages) to some users, while this secret information can be hidden from other users (for example, by disconnecting them or placing them on hold). Utilizing the collaborative WWTW browser, the users can establish separate voice links with one another (in any combination or sub-combination) in order to share secret/private information.

VoiceSites can be utilized in many different contexts. For example, a VoiceSite can be utilized for training (teaching, browsing, general classroom discussions and the like). Using a collaborative WWTW browser according to an embodiment of the invention, one to one, one to many (classroom type) and many to many conversations are easily managed. For example, users can collectively or selectively converse with (for example, offer help to) others who are "logged in" to a particular VoiceSite. Status messages like "Ready to Help", "Do Not Disturb", "Ready to chat" et cetera can be communicated amongst users within the VoiceSite. Moreover, VoiceSites can be utilized for many other purposes, such as hosting games (for example, a Battleship game or word games (users guessing the same phrases) where concealing each other's moves (voice communications) is desirable).

Moreover, the VoiceSite can host any number of voice-enabled applications, such as a Help Agent for getting help while browsing a VoiceSite and then continue normally after talking to the Help Agent. Social interactions with friends on a VoiceSite can be implemented. For example, a user can find out, via consulting the database, if their friends are currently online (at one of many different VoiceSites hosted/linked within the system to which the user has connected) and then choose to connect to them, start a conference, visit a VoiceSite together, send an "online" message, et cetera. As will be understood by those having ordinary skill in the art, elaborate conferencing can be conducted using a system according to embodiments of the invention even if the user's phones do not support such conferencing normally and there is no central dial-in number.

Moreover, since the database 280 can be utilized to store information such as contacts, history and bookmarks of VoiceSites preferred by the user, the user can share these bookmarks with other Telecom Web users. Thus, the database entries can become common database entries for a group of users whenever they browse together. For example, if a user says "history" to the collaborative WWTW browser during a call, the collaborative WWTW browser can retrieve the common database entries (common history) or retrieve a union of all the users' histories.

VoiceSites can be configured to automatically notify other users that a new user has logged into the VoiceSite or to make an outbound call to a user to notify them. History sharing (for example of VoiceSites visited) can be communicated to friends or trusted people. Voice site "audioshots" (analogous to snapshots) (audio profiles) can be stored and communicated among users. Any VoiceSite interaction can be recorded by a user and then shared with other people (like radio programs). Regions or cultures where vocal approvals are required from people can be implemented using the VoiceSites (for example, a VoiceSite can make an outbound call to people for approvals/entry of passwords et cetera). The system is also configurable to choose which parts of the conversation parties hear (for example, utilizing the "tabbed" browsing discussed herein hear).

As will be appreciated by those having ordinary skill in the art, a collaborative WWTW browser can be implemented utilizing a wide variety of electronic devices. In this regard, a non-limiting and exemplary electronic device suitable for implementing embodiments of the invention is presented herein.

Figure 5:
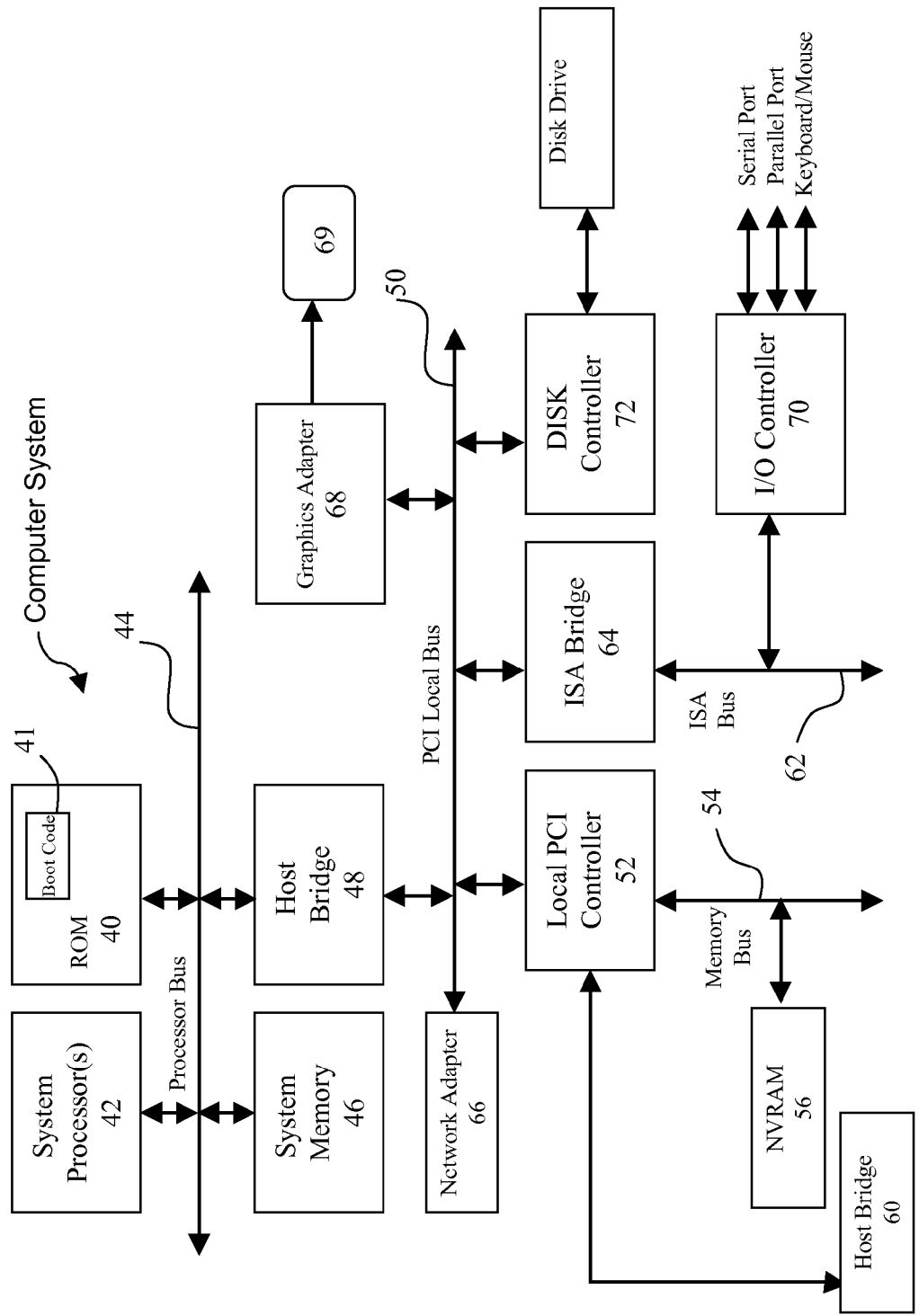
FIG. 5 illustrates a computer system according to an embodiment.

Referring now to FIG. 5, there is depicted a block diagram of an illustrative embodiment of a computer system. The illustrative embodiment depicted in FIG. 5 may be an electronic device such as a server, or a laptop or desktop personal computer. As is apparent from the description, however, the embodiments of the invention may be implemented in any appropriately configured device, as described herein.

As shown in FIG. 5, computer system includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system to LAN, and graphics adapter 68, which interfaces computer system to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system further includes Industry Standard Architecture (ISA) bus 62, which is coupled to PCI local bus 50 by ISA bridge 64. Coupled to ISA bus 62 is an input/output (I/O) controller 70, which controls communication between computer system and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

It should be noted as well that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
one or more processors; and
a computer readable storage medium having computer readable program code embodied therewith and executable by the one or more processors, the computer readable program code comprising:
computer readable program code configured to perform the following at a collaborative browser:
receive one or more commands, destined for the collaborative browser, from one or more end users over one or more voice channel links, wherein the one or more commands comprise one or more auditory commands;
interpret the one or more commands;
establish one or more additional voice channel links, according to the one or more commands, to establish a collaborative telecom web browsing session between two or more end users and one or more voice applications where the two or more end users are enabled to intercommunicate, and thereupon collaborate to visit one or more voice sites jointly;
wherein the establishing of a collaborative telecom web browsing session permits one or more additional commands from the two or more end users to be directed to the one or more voice sites, wherein the one or more additional commands comprise one or more auditory commands; and
distinguish between the one or more auditory commands destined for the collaborative browser and the one or more auditory commands to be directed to the one or more voice sites;
wherein if the one or more auditory commands are specific to the one or more voice sites, then a command interpreter passes on to a call manager the one or more auditory commands specific to the one or more voice sites.

2. The apparatus according to claim 1, wherein the collaborative telecom web browsing session comprises one or more voice based social interactions between the two or more end users.

3. The apparatus according to claim 2, wherein the one or more voice based social interactions comprise automatic notification sent to an end user that another predetermined end user has connected to the telecom web.

4. The apparatus according to claim 3, wherein the one or more commands include one or more of:
a command from a first end user to establish a voice link with the predetermined end user connected to the telecom web;
a command to establish a conference call between a subset of end users;
a command to establish a tabbed browsing session of a voice application between a subset of end users; and
a command from a first end user to send a voice message to one or more other end users.

5. The apparatus according to claim 4, wherein the voice message comprises a private voice message.

6. The apparatus according to claim 1, wherein the collaborative telecom web browsing session comprises a tabbed browsing session linking together two or more end users and a voice application.

7. The apparatus according to claim 1, wherein the computer readable program code further comprises:
computer readable program code configured to retrieve from a history of a database one of one or more previous voice applications visited by a group of end users in response to a history command of an end user included in the group of end users.

8. The apparatus according to claim 1, wherein the computer readable program code further comprises:
computer readable program code configured to retrieve one or more bookmarks from a database in response to a bookmark command of an end user, the one or more bookmarks comprising a voice description of a previous voice application visited by one or more end users.

9. The apparatus according to claim 1, wherein the computer readable program code further comprises:

computer readable program code configured to record a bookmark to a database in response to a bookmark command of an end user, the bookmark comprising a voice description of a voice application.

10. A method comprising:

performing the following at a collaborative browser:

receiving one or more commands, destined for the collaborative browser, from one or more end users over one or more voice channel links, wherein the one or more commands comprise one or more auditory commands;

interpreting the one or more commands; and establishing one or more additional voice channel links, according to the one or more commands, to establish a collaborative telecom web browsing session between two or more end users and one or more voice applications where the two or more end users are enabled to intercommunicate, and thereupon collaborate to visit one or more voice sites jointly;

wherein said establishing of a collaborative telecom web browsing session permits one or more additional commands from the two or more end users to be directed to the one or more voice sites, wherein the one or more additional commands comprise one or more auditory commands; and distinguishing between the one or more auditory commands destined for the collaborative browser and the one or more auditory commands to be directed to the one or more voice sites;

wherein if the one or more auditory commands are specific to the one or more voice sites, then a command interpreter passes on to a call manager the one or more auditory commands specific to the one or more voice sites.

11. The method according to claim 10, wherein the collaborative telecom web browsing session comprises one or more voice based social interactions between the two or more end users.

12. The method according to claim 11, wherein the one or more voice based social interactions comprise automatic notification sent to an end user that another predetermined end user has connected to the telecom web.

13. The method according to claim 12, wherein the one or more commands include one or more of:

a command from a first end user to establish a voice link with the predetermined end user connected to the telecom web;

a command to establish a conference call between a subset of end users;

a command to establish a tabbed browsing session of a voice application between a subset of end users; and a command from a first end user to send a voice message to one or more other end users.

14. The method according to claim 13, wherein the voice message comprises a private voice message.

15. The method according to claim 10, wherein the collaborative telecom web browsing session comprises a tabbed browsing session linking together two or more end users and a voice application.

16. The method according to claim 10, further comprising retrieving from a history of a database one of one or more previous voice applications visited by a group of end users in response to a history command of an end user included in the group of end users.

17. The method according to claim 10, further comprising retrieving one or more bookmarks from a database in response to a bookmark command of an end user, the one or more bookmarks comprising a voice description of a previous voice application visited by one or more end users.

18. The method according to claim 10, further comprising recording a bookmark to a database in response to a bookmark command of an end user, the bookmark comprising a voice description of a voice application.

19. A computer program product comprising:

a non-transitory computer readable storage medium having computer readable program code embodied therewith, the computer readable program code comprising:

computer readable program code configured to perform the following at a collaborative browser:

receive one or more commands, destined for the collaborative browser, from one or more end users over one or more voice channel links, wherein the one or more commands comprise one or more auditory commands;

interpret the one or more commands;

establish one or more additional voice channel links, according to the one or more commands, to establish a collaborative telecom web browsing session between two or more end users and one or more voice applications where the two or more end users are enabled to intercommunicate, and thereupon collaborate to visit one or more voice sites jointly;

wherein the establishing of a collaborative telecom web browsing session penults one or more additional commands from the two or more end users to be directed to the one or more voice sites, wherein the one or more additional commands comprise one or more auditory commands; and distinguish between the one or more auditory commands destined for the collaborative browser and the one or more auditory commands to be directed to the one or more voice sites;

wherein if the one or more auditory commands are specific to the one or more voice sites, then a command interpreter passes on to a call manager the one or more auditory commands specific to the one or more voice sites.

* * * * *